United States Patent Office 3,279,778
Patented Oct. 18, 1966

3,279,778
CONTROLLER ADJUSTING MECHANISM
Hans Jørgen Jespersen, Sonderborg, Denmark, assignor to Danfoss A/S, Nordborg, Denmark, a company of Denmark
Filed Mar. 31, 1964, Ser. No. 356,300
Claims priority, application Germany, Apr. 2, 1963,
D 41,269
8 Claims. (Cl. 267—1)

This invention relates generally to automatic control and more particularly to an automatic slip-clutch for controllers in which the control point settings are determined by controlling the force applied by a control spring.

In the control art, automatic or manually operated operators may serve for automatic control or for automatic operation. These controllers measure the control variables without necessarily producing a visual indication and produce corrective action when the variable departs from the desired value of limits to bring it back again. These controllers may have systematic response to a variable and may incorporate self-regulation. They carry out throttling control or on-and-off control. For example, control valves and other self-actuated pressure controllers, for example thermostats and the like can be considered automatic controllers. The controllers of the type having a spring which is variably adjusted to exert a force, for example a balancing force or force in opposition to some variable are generally set by variably compressing the spring. The range of control settings of the variable is established by mechanical stops that limit the extent of the adjustment of the spring.

These stops are intended to limit the range of settings possible and also to preclude damage to the controller itself by misoperation, for example in some controllers a nut controlling the spring is precluded from being "backed off" completely, to preclude inadvertent disassembly of the control members of the controllers, by use of a mechanical stop. However, controllers constructed in this manner have a serious limitation in that the operating members can be jammed when they are actuated against the stop and then forced against it by strong application of force. Since controllers generally are set and the control points determined and established for a long period of time without readjustment, if further adjustment is required, the mechanism may be so badly jammed that a new setting of control points of operation is impossible.

It is a principal object of the present invention to provide mechanism for a controller for determining a limiting point of the control point settings settable by the operator within a given range of settings.

Another object of the present invention is to provide mechanism precluding jamming of the adjustment member of the controllers.

A feature of the invention is the provision of mechanism for automatic or manually operated controllers for variably compressing a control spring therein by a slip clutch comprising a pair of cooperative members for variably compressing the spring. These clutch members are provided with means for automatically declutching them to render the adjusting mechanism ineffective when a given limit of the range of settings of the variable to be controlled is reached.

Another feature of the invention is a controller construction in which the control spring, of the controller, which exerts the opposing force variably setting the range of the variable to be controlled cooperates with the slip clutch in determining the point at which the clutch members automatically declutch. Thus, the point at which declutching takes place can be kept outside of the limits of the range of settings determined by the opposition force exerted by the spring and not affecting the desired range of possible setting in the controller.

Another feature of the invention is the structure of the slip clutch in which a punched gear is employed for variably positioning axially a threaded member cooperative therewith forming the clutch and variably compressing the control spring. The threaded member is preferably constructed with a surface cooperating with a face surface of the gear by provision of protuberances on one of the two cooperating members receivable in recesses in the other member which couple the two members for carrying out the clutching function and cooperate in declutching them when a given resistance between the clutching protuberances and the recesses is overcome so that the slip clutch releases and further adjustment in one direction of control of the control spring is precluded.

Other features and advantages of the control in accordance with the present invention will be better understood as described in the following specification and appended claims, in conjunction with the following drawing in which:

Figure 1:
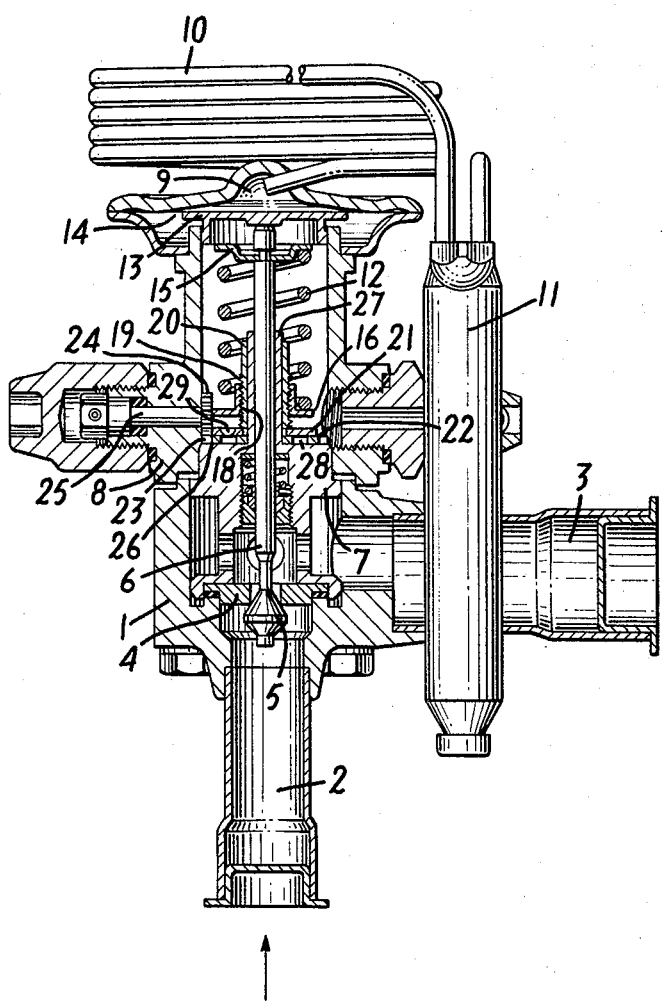
FIG. 1 is a sectional view of a control valve provided with the invention.

While the present invention will be described as applied to an expansion valve of a refrigerating system, it will be understood that the invention is not limited to this type of controller and is equally applicable to other types of control valves or controllers such as thermostats, on-off controllers and throttling controllers of various types and self-regulation controllers in which the control settings may be manually set or automatically set by remote setting so long as the control settings are determined as a function of a force exerted by a spring in which the control spring is variably adjusted by compression and extension thereof for applying a control force, for example an opposition force for developing a differential pressure used in regulation or control of a variable. The invention is preferably applicable to controllers constructed as control valves and thermostats and the like. In the drawings, a controller, in the form of an expansion valve, is illustrated comprising a valve body 1 to which is connected a supply conduit 2 connected, for example, to a condenser of a refrigeration system, not shown, and an outlet conduit 3 for delivery of refrigerant to an evaporator, not shown. The expansion valve comprises a seat 4 and a valve member 5 operated to a seated position as shown in FIG. 1 closing the valve and an unseated position when the valve is open. The valve member 5 is actuated by a valve stem 6 extending axially through a valve body member 7 and extending axially into a bonnet 8 constructed as a thermostatic regulator is hereinafter explained. The regulator 8 is provided with a chamber 9 to which is connected a capillary tube 10 connected to a sensing element 11, for example a bulb, filled with a fluid and disposed for sensing temperature of the evaporator, not shown, for developing a pressure differential in conjunction with a control spring 12 disposed axially and circumferentially and radially, outwardly of the valve stem 6.

Figure 2:
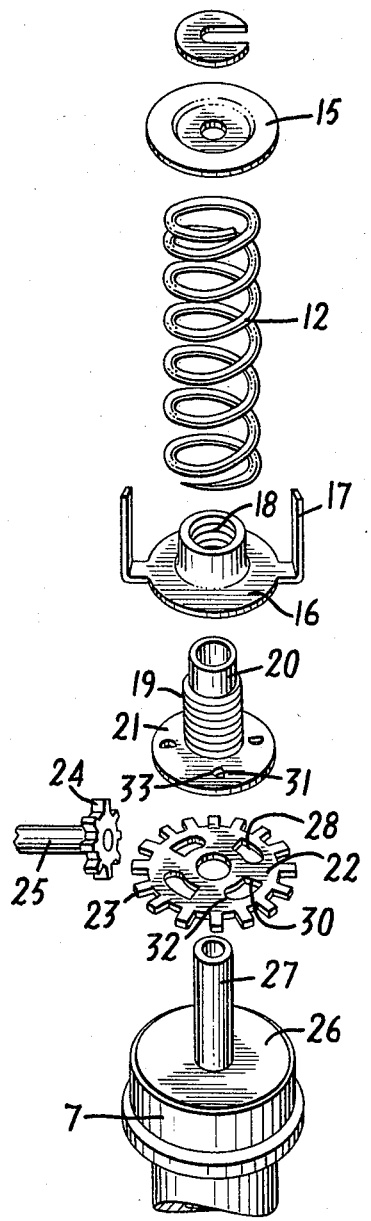
FIG. 2 is an exploded view of a slip clutch according to the invention.

The valve stem 6 has an end thereof bearing against a plate 13 capable of moving axially relative to the housing of the regulator 8 in response to deflection of a diaphragm 14 to which it is connected and which deflects variably in response to pressure changes in the chamber 9. An upper end of the spring 12, as illustrated in the drawings, abut against a dished member 15 which bears on an underside of the plate 14. The opposite end of the spring is seated on a flange surface of a member 16 provided with arms 17 as illustrated in FIG. 2. The arms 17 are received in axially extending recesses of the regulator housing to preclude angular rotation of the member 16 yet allow axial travel thereof as hereinafter explained.

The abutment member 16 is provided with a central portion defining a threaded bore having threads 18 therein and extends axially, inwardly into the spring 12. The threads 18 are complementary to threads 19 provided on a clutch member 20 on which the member 16 is threaded for axial travel as later explained. The member 20 has a radial flange 21 which seats on a major face surface of a gear 22 provided with peripheral teeth 23 which are engaged by a gear 24 on the end of the shaft 25 extending axially, outwardly of the regulator through a packing box and provided with a suitable head for variably adjusting the settings on the valve manually from outwardly of the valve upon removal of a cap as illustrated.

The gear 22 rests on a face 26 of a valve body member 7 and is guided in its angular rotation by an axially extending projection 27 of the valve member 7 of a reduced diameter which extends axially through a center opening of the gear 22 and through an axial bore of the member 20, so that it extends axially of the spring 12. The axial projection 27 is provided with a central bore as illustrated through which the valve stem 6 extends axially and is guided in its axial travel in opening and closing the valve.

The member 20 and gear 22 form a slip friction clutch as hereinafter explained. The gear 23 is provided with angularly disposed spaced openings or recesses 28 in which are respectively received a plurality of protuberances 29 extending axially downwardly from the underside of the flange 21 of the clutch member 20. Each of the recesses 28 have a flat side or edge 30 cooperative with a flat side 31 of the protuberances 29 and a curved arcuate end 32 of the openings 28 cooperates with a curved surface 33 of the protuberances 29.

The reason why the projection 29 has one sharp edge and one round edge is the following: If the shaft 25 is turned to the left, the member 16 will compress the spring 12. By turning the shaft 25 right, the opposite thing will happen. When the member 16 is right against the flange 21 continuation of the turning of the shaft 25 in the same direction would cause the teeth 23 to break, if no provisions for avoiding this have been made. Due to the round edge of the projection 29 the screwing support 16 will only be lifted a bit when the shaft 25 continues to be turned in the same direction. By turning the shaft to the left, the member 16 will be lifted upwards until it reaches the end of the threads 19. Continuation of the turning of the shaft 25 in the same direction will make the member 16 rest on top of the threads 19 from where it will not be able to go any further. The flange 21 has a sleeve 20 which is less in diameter than the threads 19 and because of this the member 16 will be able to screw itself on the threaded part 19 when the shaft is turned in the opposite direction. By means of this feature the member 16 has its stop or limit defined.

Thus, it can be seen that when the flat surfaces of the clutch members are engaged a firm positive clutching condition is established so that as the gear 22 is rotatably driven by rotation of the gear 24 in one direction of rotation, for example in a direction for compressing the spring 12, the variable adjustment of the spring 12 can take place. When the gear 22 is driven in an opposite direction the member 20 is driven in the same direction so that the travelling abutment member 16 travels axially on the member 20 allowing the spring to expand, for example, and when a given decreased spring resistance is reached, the friction between surfaces of the clutch members decreases and the protuberances will slip out of their engaging recesses.

Those skilled in the art will recognize that the spring 12 is the only spring required for variably adjusting settings for controlling the variable, in the present example, refrigerant flow, as a function of differential pressures developed by the sensing element and the opposing force of the spring 12. Moreover, the spring 12 functions to apply a force frictionally engaging the two cooperating surfaces of the slip clutch members 20, 22 so that as the spring tension is decreased, the frictional force between the clutch members decreases so that the protuberances effect declutching for example, more readily if the protuberances are constructed in this manner. Moreover, as the spring is compressed the frictional cooperation between the clutch members increases.

The clutch members are constructed so that they will slip out of engagement rendering the spring adjustment mechanism ineffective at a point outside of the desired range of control points settable by the mechanism. When the mechanism is ineffective it is impossible to jamb any members of the mechanism if the gear 24 continues to be rotated in a direction allowing the control spring to expand since the mechanism is free of mechanical stops. Those skilled in the art will readily recognize that the construction of the adjustment mechanism according to the invention is applicable to all kinds of controllers in which a control spring is used to control a variable to be controlled or control points thereof set.

While a preferred embodiment of the invention has been shown and described it will be understood that many modifications and changes can be made within the true spirit and scope of the invention.

What I claim and desire to secure by letters patent is:

1. In a controller having a control spring for variably setting a range of control point settings of a variable to be controlled by variably setting a force exerted by said spring in operation, adjusting mechanism comprising adjustable means for variably compressing said control spring having a clutch for setting a given range of control point settings, said clutch having a pair of cooperative members for variably compressing said spring, said members having means for automatically declutching said members to render said adjusting mechanism ineffective when a given limit of said range is exceeded.

2. In a controller having a control spring for variably setting a range of control point settings of a variable to be controlled by variably setting a force exerted by said spring in operation, adjusting mechanism having adjustable means for variably compressing said control spring comprising a clutch for setting a given range of control point settings, said clutch having a pair of cooperative members for variably compressing said spring, said members having means for automatically declutching said members to render said adjusting mechanism ineffective when a given limit of said range is exceeded, one of said pair of members comprising a threaded member having an axial thread and driven rotationally for adjusting said spring, said adjustable means comprising another member having a thread complementary to said thread on said one member for traveling axially thereon in opposite directions for compressing said spring and allowing it to expand in accordance with the axial position of the last mentioned member relative to said threaded member.

3. In a controller according to claim 2, in which said spring is seated at one end on said another member for biasing said pairs of cooperative members into frictional engagement.

4. In a controller according to claim 2, in which said pair of members in said clutch comprise frictionally cooperating face surfaces, and in which said spring is disposed seated on said another member and variably biases said face surfaces together.

5. In a controller according to claim 2, in which said means for automatically declutching said pair of members in said clutch comprise frictionally cooperating face surfaces and protuberances on one of said face surfaces, and recesses for receiving said protuberances releasably said spring being disposed to variably bias said surfaces into frictional engagement, and said protuberances and recesses being configured to disengage when the force applied by said spring reaches a given limit.

6. In a controller according to claim 2, in which another member of said pair of clutch members comprises a stamping having a gear configuration and peripheral teeth, and in which said adjusting mechanism includes another gear cooperative with said another member for variably angularly driving said another member and in which said means for declutching said pair of clutch members comprise frictionally engaged face surfaces declutchable in accordance with a predetermined lower limit of the force exerted by said spring.

7. In a controller valve having a control spring for variably setting a range of control point settings of a variable flow to be controlled by variably setting a force exerted by said spring in operation, adjusting mechanism having adjustable means for variably compressing said control spring comprising a clutch for setting a given range of control point settings, said clutch having a pair of cooperative members for variably compressing said spring, said members having means for declutching said members to render said adjusting mechanism automatically ineffective when a given limit of said range is exceeded.

8. In a controller valve having a control spring for variably setting a range of control point settings of a variable flow to be controlled by variably setting a pressure differential settable as a function of a force exerted by said spring in operation, adjusting mechanism having intermittently adjustable means for variably compressing said control spring comprising a slip clutch for setting a given range of flow control point settings, said slip clutch having a pair of cooperative members for variably compressing said spring, said members having means for automatically declutching said members to render said adjusting mechanism ineffective when a given limit of said flow range is exceeded.

References Cited by the Examiner
UNITED STATES PATENTS

| | | | |
|---|---|---|---|
| 2,182,718 | 12/1939 | Anderson et al. | 62—225 |
| 2,288,067 | 6/1942 | Boileau | 62—225 |
| 2,497,677 | 2/1950 | Lathrop | 62—225 |
| 2,520,386 | 8/1950 | Dillman | 62—225 |

ARTHUR L. LA POINT, *Primary Examiner.*

R. M. WOHLFARTH, *Assistant Examiner.*